F. H. WADDILL & R. D. FONDA.
AUTO CRANKING DEVICE.
APPLICATION FILED JUNE 28, 1911.
1,026,534.
Patented May 14, 1912.
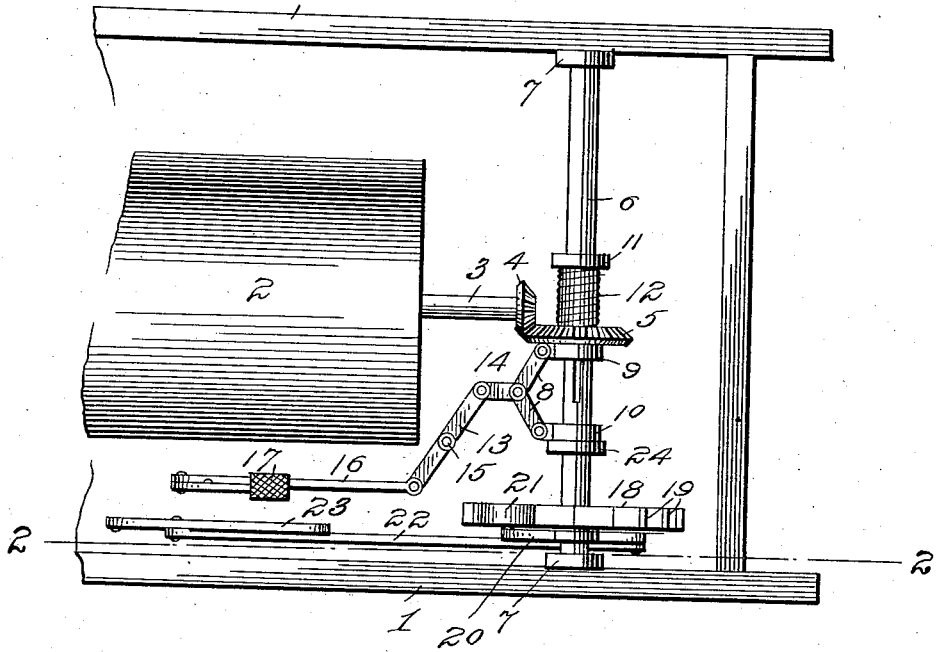
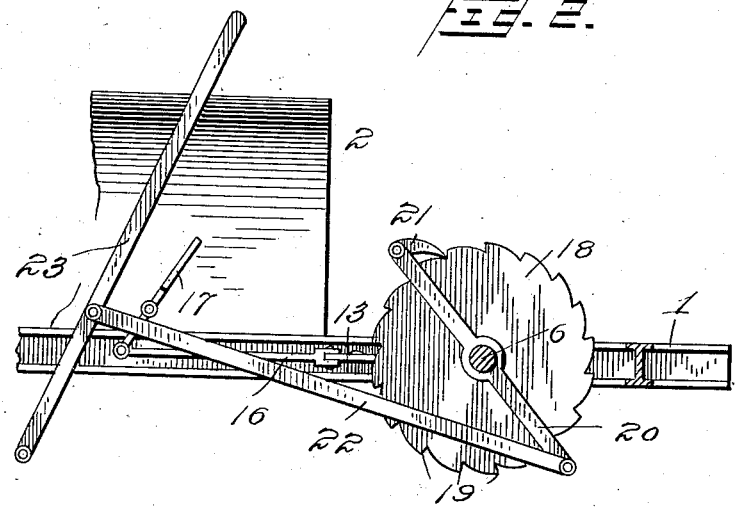
Inventor
Roy D. Fonda & Fletcher H. Waddill.
Witnesses
By Victor J. Evans
Attorney

UNITED STATES PATENT OFFICE.

FLETCHER H. WADDILL AND ROY D. FONDA, OF DEXTER, NEW MEXICO.

AUTO CRANKING DEVICE.

1,026,534.      Specification of Letters Patent.      Patented May 14, 1912.

Application filed June 28, 1911. Serial No. 635,725.

*To all whom it may concern:*

Be it known that we, FLETCHER H. WADDILL and ROY D. FONDA, citizens of the United States, residing at Dexter, in the county of Chaves and State of New Mexico, have invented new and useful Improvements in Auto Cranking Devices, of which the following is a specification.

This invention relates to improvements in starting devices for explosive engines, and more particularly to explosive engines used on motor vehicles, the purpose being to dispense with the usual operation of cranking either in the front or at the side of the vehicle, and to enable the operator to start the engine without the inconvenience of leaving his seat.

The invention contemplates a cranking shaft arranged transverse the frame of the vehicle and forward of the engine shaft, each of said shafts being provided with bevel gears, and one of said gears adapted to be manually brought into engagement with the other of said gears, whereby to start the engine, and means for automatically disconnecting said bevel gears upon the release of the manually controlled means; and further, to provide the cranking shaft with means whereby it may be manually revolved at the will of the operator.

With the above and other objects in view, the invention consists in the construction, combination and arrangement of parts hereinafter described and claimed, and illustrated in the accompanying drawings, wherein—

Figure 1 is a plan view of the engine of an automobile equipped with our improved starting device; and Fig. 2 is a sectional view on the line 2—2 of Fig. 1.

Referring more particularly to the accompanying drawings, wherein is illustrated the preferred embodiment of our invention, the numeral 1 designates the side bars of the chassis of a motor vehicle, and 2 the engine provided with the shaft 3. On the forward end of the engine shaft is a bevel gear 4 adapted to be engaged by a corresponding bevel gear 5 carried by a cranking shaft.

Arranged transverse the frame of the motor vehicle and forward of the engine shaft 3 is the cranking shaft 6, said shaft being journaled in suitable bearings in the side bars 1. The cranking shaft 6 is provided, at its opposite ends, with collars 7 which are keyed to said shaft and serve to prevent the shaft from shifting laterally relatively to the frame of the vehicle. A stop collar 24 is rigidly secured to the cranking shaft 6 the purpose of which will hereinafter be described. The bevel gear 5 is splined to the cranking shaft and is longitudinally slidable thereon by means of links 8. The links 8 are connected at one end to collars 9 and 10, the said collars being loosely mounted on the shaft 6 and adapted for longitudinal movement relative to said shaft, under the influence of the links 8. The collar 10 is adapted to engage the stop collar 24, in the operative movement of the links, and the collar 9 engages the bevel gear 5, whereby upon the collar 10 engaging the stop collar 24 the links 8 are caused to spread thereby operating the collar 9 to slide gear 5 into engagement with the gear 4 on the engine shaft. The cranking shaft 6 is further provided with a collar 11 spaced a suitable distance from the gear 5 and is encircled by a helical spring 12 mounted intermediate the collar 11 and bevel gear 5, whereby upon the bevel gear 5 being slid into engagement with the gear 4, the spring 12 is put under tension. The outer or free ends of the links 8 are pivotally connected to each other, and to a lever 13 by means of an arm 14, the said lever 13 being pivoted intermediate its ends as at 15 and having its outer or free end connected with a rod 16, the free end of which is connected to a foot operated pedal 17.

Rigidly secured to the shaft, and rotatable therewith is an operating gear 18 formed on its periphery with ratchet teeth 19. A power lever 20, intermediate its ends, loosely encircles the shaft 6 adjacent the gear 18, and has pivotally secured to its outer end a dog 21 adapted to engage the teeth 19 of the gear 18. The other end of the said lever 20 is pivotally secured to one end of an operating lever 22, the free end of which is secured to the hand lever 23, intermediate the ends thereof. The lower end of the lever 23 is pivotally secured to the frame of the vehicle and has its upper end arranged to extend within convenient reach of the operator of the machine, when seated.

When it is desired to start the engine the operator seated in the machine applies pressure to the foot lever 17, thereby moving the bevel gear 5 into engagement with the gear 4, through the medium of the levers 16 and 13 and the links 8, and also putting the spring 12 under tension; after which operation, the lever 23 is oscillated, causing the dog 21 carried by the lever 20 to operatively engage the teeth 19 of the gear 18 thereby imparting movement to the shaft 6, and to the engine through the medium of the bevel gears 5 and 4. The lever 23 is operated until the engine is started, upon which occurrence the foot pedal 17 is released and the bevel gear 5 is moved out of engagement with the gear 5 on the engine shaft by the reaction of the spring 12.

From the foregoing description, taken in connection with the accompanying drawings, the advantages of the construction and the method of operation will be readily apparent to those skilled in the art to which this invention appertains, and while we have described the principle of operation of the invention, together with the device which we consider the embodiment thereof, we desire to have it understood that such changes may be made, if desired, as fall within the scope of the claim appended hereto.

Having thus described the invention, what we claim is,—

In a starting device for explosive engines, the combination with an engine shaft and a bevel gear mounted thereon, of a cranking shaft arranged transversely to the engine shaft and forwardly thereof, a bevel gear mounted on said cranking shaft for longitudinal movement and adapted to engage said first-named gear, a collar fixed to said cranking shaft upon one side of the bevel gear thereon, a spring encircling the shaft intermediate the collar and the gear thereon and adapted to hold the second-named gear normally out of engagement with the first-named gear, a pair of movable collars loosely encircling said cranking shaft upon the opposite side of the gear and adapted for sliding movement thereon, a link mechanism pivotally connected to said collars, a stop collar rigidly secured to said shaft and adapted to be engaged by one of said movable collars, the other of said movable collars engaging the second-named gear for sliding the same into engagement with the first-named gear against the action of the said spring, an operating lever pivotally connected to said link mechanism, a ratchet gear rigidly secured to said shaft beyond said stop collar, a power lever loosely mounted on said cranking shaft intermediate its ends and adjacent the ratchet gear, a dog pivotally connected to one end of said lever and engaging the ratchet gear, an operating lever pivotally connected to the opposite end of the power lever, and a hand lever pivotally connected to the operating lever for actuating the ratchet gear to start the engine.

In testimony whereof we affix our signatures in presence of two witnesses.

FLETCHER H. WADDILL.
ROY D. FONDA.

Witnesses to signature of Fletcher H. Waddill:
  Mon. Roe Addington,
  Brice Stephenson.

Witnesses to signature of Roy D. Fonda:
  Murray Brower,
  M. V. Ellfred.

---

Copies of this patent may be obtained for five cents each, by addressing the "Commissioner of Patents, Washington, D. C."